Figure 3:
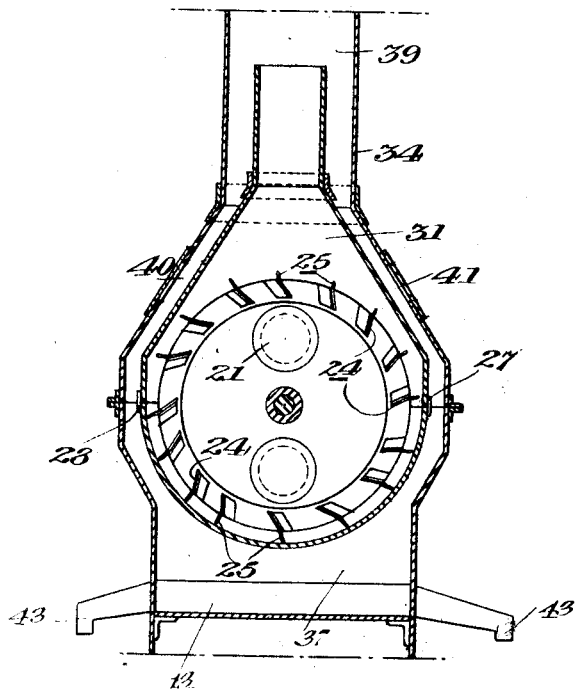

J. VORRABER.
APPARATUS FOR THE TREATMENT OF AMMONIUM SULFATE.
APPLICATION FILED NOV. 21, 1910.
1,066,067.
Patented July 1, 1913.
2 SHEETS—SHEET 1.
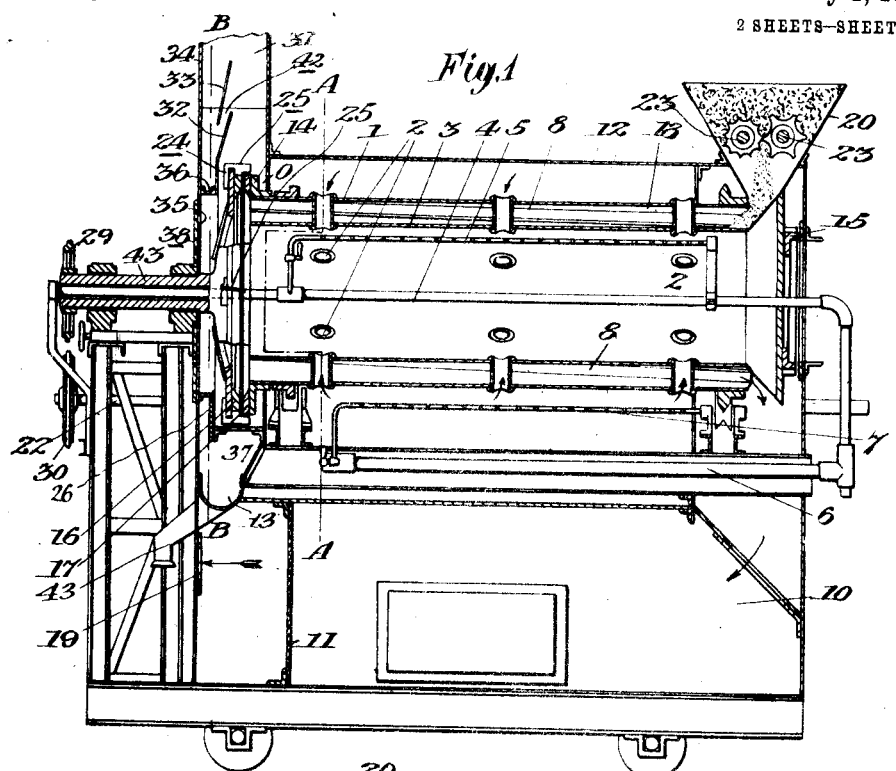
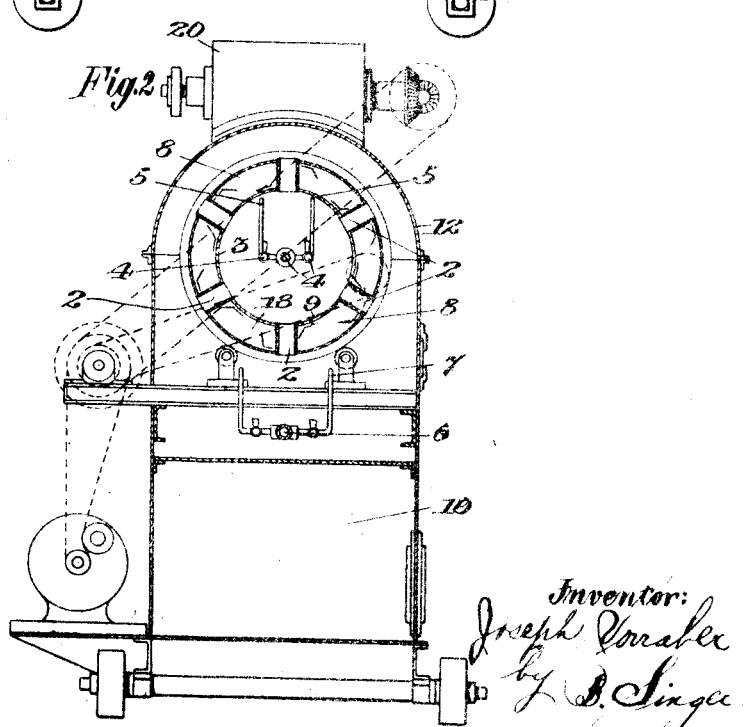

J. VORRABER.
APPARATUS FOR THE TREATMENT OF AMMONIUM SULFATE.
APPLICATION FILED NOV. 21, 1910.

1,066,067.

Patented July 1, 1913.

2 SHEETS—SHEET 2.

Witnesses:

Inventor:
Joseph Vorraber
by D. Singer
Attorney

UNITED STATES PATENT OFFICE.

JOSEF VORRABER, OF COLOGNE-LINDENTHAL, GERMANY.

APPARATUS FOR THE TREATMENT OF AMMONIUM SULFATE.

1,066,067.   Specification of Letters Patent.   Patented July 1, 1913.

Application filed November 21, 1910. Serial No. 593,478.

*To all whom it may concern:*

Be it known that I, JOSEF VORRABER, engineer, a subject of the German Emperor, and residing at 61 Hillerstrasse, Cologne-Lindenthal, Kingdom of Prussia, Germany, have invented new and useful Improvements in Apparatus for the Treatment of Ammonium Sulfate, of which the following is a specification.

The present invention relates to a machine for the dustfree drying and grinding of ammonium sulfate and simultaneously cooling the roasted ammonium sulfate, as this leaves the runners at a temperature of about 50° C. and at such a temperature is very much inclined to cake, if it is not spread for a short while in the storage room as soon as it leaves the apparatus.

This machine consists essentially of a double walled drum heated by direct sources of heat on both the outside and the inside. The walls of the drum inclose a hollow space, in which the ammonia sulfate, which has been crushed by rollers and finely disintegrated by special devices, is conducted toward the hot gases, which enter from below into the drum. The dried ammonia sulfate advancing toward the one end of the drum passes between two revolving annular runners with tangential burs, so arranged that the gap between them can be varied. These runners will finely grind and convey the dried ammonia, without the hygroscopic charge coming in contact with the humid atmosphere. The closing head of the drum is fitted with vanes extending beyond the gap between the runners, which vanes mix the induced air with the charge, so that the particles of the ground salt are brought into contact with the cold air and are forced at an increasing velocity upward in a contracted shaft. In consequence of the sudden widening of the tube with downward inclined passages at its sides, mounted on the top of this shaft, the upward motion is retarded and thereby the ammonia salt is separated from the air, and the air is forced off at the top, while the now cooled ammonia salt will fall through the side passages and the rear passage with exhaust suctions into the conveyer trough, whence it is discharged by means of left hand and right hand worms into the nozzles arranged at the sides, through which it is filled into sacks.

In the accompanying drawing Figure 1 is a longitudinal section through the machine. Fig. 2 is a cross section along A—A in Fig. 1. Fig. 3 is a cross section through the cooling attachment along B—B in Fig. 1.

The outer shell 1 of the drum is connected by means of a plurality of tubes 2 with the inside tube 3, so that a double walled or jacketed drum is formed, and on the one hand the ammonium sulfate to be dried can be freely passed between the walls 1 and 3 and on the other hand, the hot gases can be forced by the suction of a fan together with hot dry air from the space outside around the drum through tubes into tube 3 and through the ammonia sulfate to be dried.

Beneath the drum and inside the drum are introduced pipes 4 and 6 connected to a gas supply and fitted with burner tubes 7 and 5, which are provided on their upper sides with a large number of small burner holes so as to allow of heating the walls of the drum and particularly the air entering into the same and to conduct the air toward the ammonia sulfate flowing down through the hollow space 18 from the conveyer gutters. The hot gases mixed with steam are, on emerging from the space 18, passed through the filter chamber 10, and the cloth filter 11, and drawn off through an outlet 19 to which an exhauster or similar suitable means may be connected for forcing the gases through the filter 11. The moist ammonium sulfate is supplied to the hopper 20 and is seized by the toothed rollers 23 and then disintegrated. It is essential for the drying process that the speed of the rollers be adapted to the moisture of the charge so that the supply of ammonia sulfate to the drying chamber 18, in the jacketed drum 1/3 is a uniform one and the rollers 23 will act as regulators for the drying and ventilating. The conveyer webs 8 and 9 on the walls of the drying space 18, receive the ammonia sulfate to be dried and impart to it a forward strewing motion so that the hot gases passing through are offered many surfaces of attack, so that an intense drying effect is obtained and it is possible to dry large quantities at a time in a comparatively short drum. The ammonia sulfate emerging from the drying drum falls into the gap between the runners 16, 17, which receive it for further grinding it. This gap is wider on the inside than on the outside. The toothed, chilled cast runners 17 consisting of a plurality of segments, are secured to a strong ring of angle iron attached to the rear end of the shell of the drum. These runners slowly revolve with the drum so that all teeth will come into action and will be uniformly worn. The runners are provided with suitably arranged teeth, by means of which the ammonia sulfate may be ground down to a mealy consistency at a moderate speed of revolution. The upper runner 21, which at the same time serves to close the drum is journaled with its pin 43 in two bearings and is driven by means of sprocket wheels 29, 30 from the countershaft 22 at the side of the apparatus. The runner 16 consists also here of a plurality of segments with teeth, which are coarse inside and are reduced toward the outside. The slanting teeth terminate preferably at the circumference of the runners so that a smooth annular surface, a few millimeters wide, remains.

The closing runner 21 is provided on its face end, behind the runner 16, with tangentially arranged short vanes 24, the ends 25 of which have a radial direction at their circumference and reach over the runner 17. The ends 25 of these vanes are slightly inclined and the ends are bent forward over the runner 17 so as to keep the charge together at the sides and to throw it off at the top.

The lower half of the grinding apparatus is closed by a sheet metal partition 26 against the passages 40, 41, and the shaft 31 is provided with plates 32, 33 forming with the wall 34 of said shaft a chamber.

The charge falls from the grinding apparatus into a hopper 13, which terminates in two sack spouts 43. The drying drum and the grinding apparatus are inclosed in a dustproof manner by a sheet metal shell; a fan (not shown) connected at 19 will furthermore suck any particles of dust, which reach the joints, away into the dust chamber 10.

The front wall 34 of shell 12 of the drying apparatus has a wide aperture 35, which is separated by an annular wall from the chamber 37 and through which the vanes 24, 25 will aspirate the fresh air. By means of slide 38 the quantity of air induced may be controlled.

The rapid rotation of the runner 21 with the thereto attached suction vanes 24 and the conveying webs 25 will throw the hot ammonia salt emerging from the gap of the grinder together with the simultaneously admitted fresh air through the shaft 31, whereby the cold air can meet and cool the individual particles of salt.

By the two back walls 32, 33 being obliquely fitted in the shaft two constrictions of the latter are produced which increase the velocity of the escape of the air impregnated with ammonia salt.

The suddenly widening chamber 39 over the end of the shaft leaves a clear passage for the current of air and ammonia salt; the air will force the heavier ammonia salt aside where the latter will fall down.

By the walls of the shaft and the walls of the chamber 39 two passages 40 and 41 are formed, and by the wall 34 and the plates 32, 33 the chamber o is formed, which conduct the falling ammonia salt to any suitable mechanism (not shown) arranged below, which will convey the cooled ammonia salt to the sack spouts 43 whence it is filled into sacks. Fumes which may be still contained in the ammonia salt will be aspirated by the air current flowing through slot 42 and be carried up into a dust collecting chamber or be allowed to escape into the atmosphere.

By the grinding apparatus being arranged behind the discharge of the drying drum, so that no moist air from outside has access and the charge may therefore fall into the sacks quite dry and without raising any dust, a possibility of a dustfree drying and grinding of ammonium sulfate is obtained with this machine, which was hitherto unknown and this method therefore admits of the apparatus being arranged in inhabited localities without any danger to the persons dwelling therein.

I claim:

1. A machine for the dust-free drying of ammonium sulfate, comprising in combination, a drum having inner and outer walls or shells, tubes connecting said shells, means for supplying crushed ammonium sulfate, burners for heating the inner and outer shells, and a filter through which the hot gases from said shells are drawn off, substantially as described.

2. A machine for the dust-free drying and cooling of ammonium sulfate, comprising in combination, inner and outer shells, a casing surrounding said shells, and containing a filtering chamber, connected with said shells, a filter in said chamber through which the gases are exhausted through an outlet of said chamber, tubes connecting said shells, means for delivering crushed ammonia sulfate between said shells, burners for supplying hot air to the inner and outer shells and to the space between said shells, means for allowing the exhaust of the gases through said filter, a shaft leading from said casing, a head for said shells provided with vanes to throw the charge into said shaft, said casing having an opening for admitting cold air to be induced by the action of the vanes and mixed with the charge.

3. A machine for the dust-free drying and cooling of ammonium sulfate, comprising in combination, inner and outer shells, tubes connecting said shells, burners supplying hot air to the inner and outer shells and to the space between said shells, means for supplying crushed ammonium sulfate to the space between said shells, a casing inclosing said shells and provided with a filtering chamber and filter through which said gases are adapted to be drawn off from said shell, a shaft and a cold air inlet for said casing, a head closing said shells and provided with vanes for inducing cold air through said opening and mixing it with the charge and forcing the charge into said shaft, walls surrounding said shaft on three sides thereof and spaced apart therefrom and obliquely disposed plates on the remaining sides of said shaft arranged in spaced relation, substantially as and for the purpose set forth.

In testimony whereof I affix my signature in presence of two witnesses.

JOSEF VORRABER.

Witnesses:
LOUIS VANDORY,
FRANK SALONER.